Oct. 22, 1963  G. EDLEN  3,107,918
PUZZLE
Filed Sept. 17, 1959
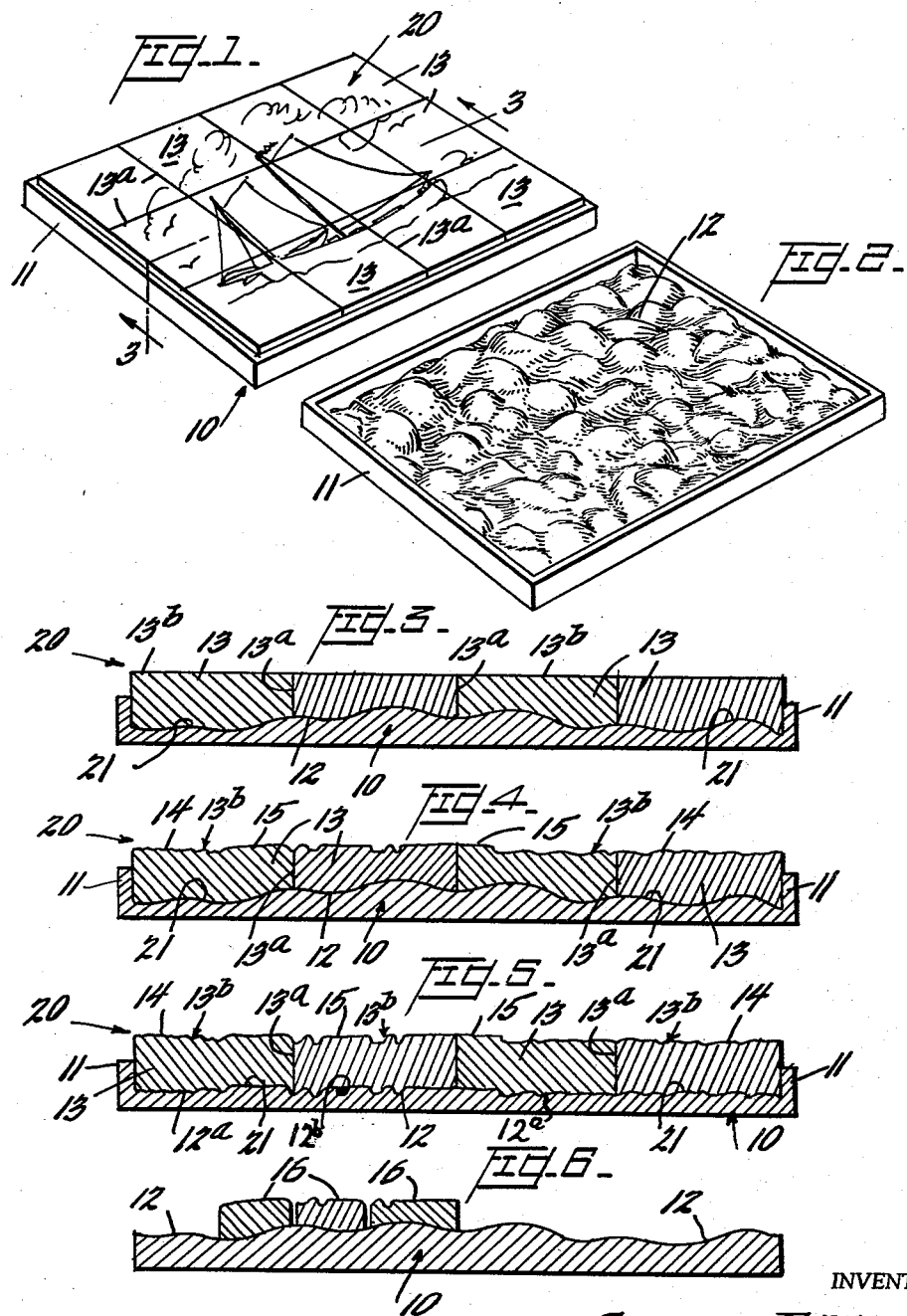
INVENTOR
George Edlen,
BY Paris, Haskell & Levine
ATTORNEYS

United States Patent Office 3,107,918
Patented Oct. 22, 1963

3,107,918
PUZZLE
George Edlen, 3908 Havard St., Silver Spring, Md.
Filed Sept. 17, 1959, Ser. No. 840,739
2 Claims. (Cl. 273—157)

The present invention relates to puzzles, and more particularly is a puzzle depending upon the mating of contoured surfaces for its solution.

In some respects the present invention is akin to jig saw puzzles, in that the puzzle solution depends upon the proper relative arrangement of a plurality of pieces, and wherein the solution provides a completed picture, design, or the like, on the surface of the assembled pieces. In the instance of conventional jig saw puzzles, the puzzle is solved by mating the abutting edges of the pieces of the puzzle, and to this end, the pieces of the puzzle are usually cut in irregular configuration. In accordance with the present invention, however, a new dimension is included in the solution of the puzzle, namely the mating of irregular complementary surface contours. To this end, the puzzle comprises a matrix or base member having a varyingly contoured surface, and a plurality of puzzle pieces having contour conformations on one surface that mate with corresponding portions of the matrix. Thus, the proper positioning or location of the pieces on the matrix is guided and determined by the mating conformations of their adjacent surfaces. The solution or completion of the puzzle resides in locating each piece in its proper surface contour mating position on the matrix, and the pieces may then constitute a complete covering of the matrix, and produce a complete contoured or flat picture, or the like. On the other hand, the pieces may constitute only a partial covering of the matrix, so that the combination of the exposed portion of the matrix and the properly applied overlying pieces constitute a completed picture, or the like. Or the pieces may completely cover the matrix, but be in part transparent, so that again the total or completed picture, design, or the like, is formed by the composite of the matrix and the properly located pieces. One surface of each piece is thus necessarily contoured to mate with a corresponding portion of the matrix contour, while the opposite surface of each piece may be flat, or may be contoured in exact conformance with the first side, or may be contoured differently from the first side.

From the foregoing general description, it will be appreciated that the primary key to solution of the puzzle resides in matching the surface contours of the pieces with the corresponding mating contour areas on the matrix. Therefore, it is not essential that the edges of the pieces be irregularly shaped, as in conventional jig saw puzzles, for edge mating is not an essential key to solution in the present instance. Hence, the pieces may merely have straight or regular edges. And in some instances, it is not even essential that the pieces occupy edge abutting relationships. However, if desired, the pieces may be provided with irregularly shaped mating edges, in conventional jig saw puzzle fashion, to provide this additional key to solution of the puzzle.

It is accordingly one object of the present invention to provide a contour puzzle, depending on mating of irregular surface contours for solution.

Another object of the present invention is to provide a contour puzzle having for its solution the location of a plurality of pieces having varied and irregularly contoured surfaces upon mating contours provided on a prescribed puzzle board or matrix.

Still another object of the present invention is to provide such a puzzle wherein a completed picture, design, or the like, is diplayed by completion thereof.

A further object of the present invention is to provide such a puzzle wherein the completed picture, design, or the like is made up from the pieces alone.

Another object of the present invention is to provide such a puzzle wherein the completed picture, design, or the like is made up by a composite of the pieces and matrix combined.

Other objects and advantages of the present invention will be apparent to those skilled in the art from a consideration of the following exemplary detailed description of the invention had in conjunction with the accompanying drawings, in which like numerals refer to like or corresponding parts, and wherein:

FIG. 1 is a perspective view of a completed puzzle in accordance with the present invention;

FIG. 2 is a perspective view of the matrix employed in FIG. 1, with the puzzle pieces removed;

FIG. 3 is a cross-sectional view taken along the line 3—3 of FIG. 2;

FIG. 4 is a cross-sectional view of a modified form of the puzzle, corresponding to the section of FIG. 3;

FIG. 5 is a cross-sectional view of a second modified form of the puzzle, corresponding to the section of FIG. 3;

FIG. 6 is a cross-sectional view of a third modified form of the puzzle, corresponding to the section of FIG. 3.

Considering first the embodiment illustrated in FIGS. 1–3, it will be immediately apparent that the puzzle solution resides in properly locating a plurality of puzzle pieces 13 within the frame or matrix 10, so as to provide a completed picture, design, or the like, such as indicated in FIG. 1. Accordingly, a sheet 20 of suitable material, such as plastic, papier-mache, or a paper pulp mat, is formed with one flat surface 13b on which the picture is applied, as by printing, decalcomania, or overlay of a printed sheet. The other surface 21 of this sheet is formed with a highly irregular and widely varied surface contour, and preferably with the irregular and varied contour extending over the entire, or substantially the entire area of the sheet. This irrigular surface contour is formed on the sheet preferably with a die, or the like, to be the exact complement of the irregular contour defined on surface 12 of the matrix 10. The sheet 20 thus formed, is cut along lines 13a into the edge abutting pieces 13. Cuts 13a may be straight or irregular, as desired.

With the puzzle thus formed, the pieces 13 are assembled on the matrix 10 between edge guides 11, primarily by mating the varied and undulated contours on surfaces 21 of pieces 13 with the corresponding complementary varied and undulated contours on surface 12 of the matrix. Secondarily, of course the design or picture on surfaces 13b of pieces 13 also assists in properly locating the pieces of the puzzle. If irregular cuts 13a are employed, such edge mating or complementary irregularities would also assist.

Since the primary key to solution of the puzzle resides in mating the complementary surface contours on pieces 13 with matrix surface 12, it is preferable that the contoured surface 21 of each piece 13 be different from the contoured surface of every other piece 13, or nearly every other such piece. This dissimilarity of pieces 13 is desirable so that a particular piece would be capable of being seated on only one specified area of the matrix. However, the occasional repetition of a particular contour on the pieces and on the matrix obviously would not destroy the significance of the contour as a key to solution. Accordingly, the statement that the contoured surface of each piece is different from the contoured surface of every other piece in the puzzle, or an equivalent expression, when used herein and in the claims, is intended to include the existence of occasional identity between contoured surfaces of pieces 13.

As shown in the drawings, to be a meaningful puzzle, any one piece 13 should occupy only a minor fraction of the area of the matrix surface 12. Also, since the underlying principle of the present invention resides in mating surface contours rather than edge shapes, the pieces 13 should preferably be relatively thin or plate-like. That is the average thickness dimension of the pieces 13 between surfaces 13b and 21 should be small as compared with, and even preferably a minor fraction of, either area dimension of the surfaces 13b.

In the form of the invention shown in FIGS. 1–3, the completed picture, or the like, may be provided entirely on the surface 13b of sheet 20, and the matrix surface 12 may be of no significance except for contour mating with the pieces 13. On the other hand, the matrix surface 12 may carry a portion of the picture. For example, the entire surface 12 may be colored to represent the sea, and the waves may be embodied as a bas relief and themselves constitute the varied irregular and undulated contour of this surface. Sheet 20 may then be formed of transparent plastic, and only the boat and sky, for example, may be printed thereon. When the pieces 13 of sheet 20 are then assembled on the matrix 10, the completed picture is represented by the composite, in that the ocean background is visible in all portions except where the pieces 13 are colored to designate additional elements in the picture, such as the boat. Also, the picture may be provided in bas relief on the under surfaces 21 of pieces 13, and in intaglio on the matrix surface 12, so that after the puzzle is completed, the picture is presented by inverting the assembled matrix and pieces, and then removing the matrix. With no colorations, the subject of the picture may not be apparent from the intaglio matrix.

Instead of being flat as illustrated in FIGS. 1 and 3, the surface 13b of sheet 20, and of the resultant pieces 13, may be contoured to represent the picture, design, or the like, in bas relief. This is illustrated in FIG. 4, where the irregular portions 14 designate the ocean contour, and the portion 15 designates the sailboat. Here again, as in the previous embodiment, the complete picture can be included on the surface of sheet 20, or may be formed from a composite of the matrix surface 12 and the pieces 13 in the same manner as described for the previous embodiment.

In FIG. 4, the bas relief surface 13b is normally quite different in contour from the matrix surface 12. As in FIG. 5, however, these surfaces may be nearly identical. In the FIG. 5 embodiment the under surface and top surface of sheet 20 are formed with a corresponding contour. This may be conveniently effected by vacuum forming sheet 20 from a thin sheet of plastic upon a mandrel having the desired surface contour configuration. In this form of the invention, it is preferable that the contour in which sheet 20 is formed constitute a bas relief of the picture or design being employed. Accordingly, in FIG. 5, areas 14 of sheet 20 designate the sea and areas 15 the boat. Since the matrix surface 12 must correspond in contour with the under surface 21 of the pieces 13, it is apparent that the matrix surface 12 also designates in bas relief the picture employed for the puzzle, portions 12a representing the ocean areas and 12b the sailboat. The puzzle picture, design, or the like, may therefore be designated entirely on the surface 13b of sheet 20, or entirely on the surface 12 of the matrix with the pieces all transparent, or partially on surface 13b and partially on surface 12 with a portion of sheet 20 transparent, or the entire picture may be designated both on the matrix surface 12 and on the sheet surface 13b. This latter form of the invention, with the entire picture on both the matrix and the pieces, may be used in all embodiments of the invention, although the present embodiment is best suited therefor; and this expedient may be found particularly advantageous for a beginner's puzzle or a puzzle for young children, as an aid in developing the ability to associate mating surface contours. In this double picture approach, the picture on the matrix need not be a complete picture, but may be merely an outline of the picture, to provide some degree of picture association as a guide to surface contour mating.

A third embodiment of the invention is illustrated in FIG. 6. As in the preceding embodiments, there is provided a matrix 10 having an irregularly varied surface contour 12. This contoured surface is intended to define a picture or the like in bas relief; and continuing with the illustrative picture used in the preceding embodiments, surface 12 constitutes a bas relief and picture of the ocean waters, and perhaps the sky. Plate-like pieces 16 are pieces of the sail boat, which are applied as an overlay on matrix 10 to form a bas relief of a sailboat on the waters of surface 12. The under surfaces of pieces 16, in accordance with the principles of the present invention, are contoured to mate with the contours of appropriate sections of the bas relief contour of surface 12. Thus, the pieces 16 constituting the sailboat can be located only over the areas of the matrix surface 12 where the contours mate with the contours on the undersides of the pieces, and the solution key to the puzzle still resides primarily in mating surface contours. This embodiment of the puzzle is considered to be particularly desirable for young children. And in that connection, one particularly attractive form of the puzzle is for the matrix to carry a picture in bas relief of a wild animal, and the overlay pieces to constitute a cage for the animal when properly completed.

As has been previously indicated, it is preferred in each of the foregoing embodiments that the pieces of any given puzzle all, or nearly all, differ from each other with respect to the undulated contour surfaces adapted to mate with the varied contour on the matrix surface, so that one piece can be seated in only one position and locality on the matrix. In some instances, however, particularly where a repetitive motif exists in the picture or design configuration employed in the FIG. 5 embodiment, it may be possible to seat a number of pieces in more than one position. Although it is desired to avoid this situation as much as possible, where it does exit, one may rely on surface coloration and/or irregular abutting edges of the pieces to supplement the contour key solution to the puzzle.

From the foregoing description of several specific embodiments of the present invention, it will be appreciated that there is provided a picture type puzzle, wherein a plurality of pieces are assembled upon a matrix to form a completed picture, or the like, by mating varied and undulated contours formed over the undersides of the pieces with corresponding complementary contours defined on the surface of the matrix. Since many modifications and variations of these embodiments will be apparent to those skilled in the art, those that are embraced by the spirit and scope of the appended claims are considered to be within the purview of the present invention.

What is claimed is:

1. A contour puzzle, comprising a board forming a base for the puzzle and having an irregularly varied and undulated contour defined on one surface to provide an integrated matrix for the puzzle, a plurality of pieces adapted to be positioned on said matrix surface, one surface of each of said pieces having an irregular contour defined thereon complementary to a corresponding portion of said matrix surface, and elements of a portion of a picture or design inscribed on said pieces and elements of a portion of said picture or design inscribed on said matrix, said puzzle being solved by location of all of said pieces in contour mating relationship with said matrix to complete said picture or design.

2. A contour puzzle, comprising a board forming a base for the puzzle and having an irregularly varied and undulated contour defined on one surface to provide an integrated matrix for the puzzle, a plurality of pieces adapted to be positioned on said matrix surface, one surface of each of said pieces having an irregular contour defined thereon complementary to a corresponding portion of said matrix surface, elements of a picture or design inscribed on said pieces and together forming a complete picture or design, and a similar picture or design inscribed on said matrix, said puzzle being solved by location of all of said pieces in contour mating relationship with said matrix to complete said picture or design.

References Cited in the file of this patent

UNITED STATES PATENTS

| | | |
|---|---|---|
| 1,257,432 | Wetzel et al. | Feb. 26, 1918 |
| 1,960,216 | Schacht | May 22, 1934 |
| 2,463,270 | Hirsch | Mar. 1, 1949 |
| 2,861,358 | Ward | Nov. 25, 1958 |

FOREIGN PATENTS

| | | |
|---|---|---|
| 30,201 | Great Britain | 1909 |
| 403,432 | Great Britain | Dec. 11, 1933 |